United States Patent
Meek et al.

(10) Patent No.: US 10,382,657 B2
(45) Date of Patent: *Aug. 13, 2019

(54) METHODS, SYSTEMS, AND PRODUCTS FOR ALTERNATE AUDIO SOURCES

(71) Applicant: AT&T Intellectual Property I, L.P., Atlanta, GA (US)

(72) Inventors: Dennis Meek, Norcross, GA (US); Robert A. Koch, Norcross, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,293

(22) Filed: Jan. 15, 2016

(65) Prior Publication Data
US 2016/0134923 A1    May 12, 2016

Related U.S. Application Data

(63) Continuation of application No. 14/697,660, filed on Apr. 28, 2015, now Pat. No. 9,264,586, which is a
(Continued)

(51) Int. Cl.
*H04N 5/04* (2006.01)
*H04N 5/60* (2006.01)
(Continued)

(52) U.S. Cl.
CPC .............. *H04N 5/04* (2013.01); *H04L 65/601* (2013.01); *H04N 5/265* (2013.01); *H04N 5/44* (2013.01); *H04N 5/607* (2013.01); *H04N 21/233* (2013.01); *H04N 21/235* (2013.01); *H04N 21/242* (2013.01); *H04N 21/435* (2013.01); *H04N 21/4307* (2013.01); *H04N 21/439* (2013.01); *H04N 21/4392* (2013.01); *H04N 21/44004* (2013.01); *H04N 21/4622* (2013.01); *H04N 21/4755* (2013.01); *H04N 21/4828* (2013.01); *H04N 21/8106* (2013.01); *H04N 21/8126* (2013.01); *H04N 21/8133* (2013.01);
(Continued)

(58) Field of Classification Search
CPC .... H04N 5/607; H04N 21/242; H04N 21/235; H04N 21/4307; H04N 21/4325; H04N 21/435; H04N 21/439; H04N 21/4755; H04N 21/4828; H04N 21/8106; H04N 21/8126; H04N 21/8133; H04N 21/4392; H04N 21/44004; H04N 21/4622; H04N 21/8166; H04N 21/84; H04N 21/8547; H04N 5/04; H04N 5/265; H04N 5/44; H04N 21/233; H04L 65/601
See application file for complete search history.

(56) References Cited

U.S. PATENT DOCUMENTS 4,313,135 A    1/1982    Cooper
4,839,733 A    6/1989    Karamon
(Continued)

*Primary Examiner* — Chenea Davis
(74) *Attorney, Agent, or Firm* — Scott P. Zimmerman. PLLC

(57) ABSTRACT

Audio and video signals are synchronized for pleasing presentation of content. As content is streamed to a device, an audio portion may lag or lead a video portion. Spoken words, for example, are out of synch with the lip movements. Video content is thus synchronized to audio content to ensure streaming content is pleasing.

19 Claims, 15 Drawing Sheets

Related U.S. Application Data continuation of application No. 14/479,276, filed on Sep. 6, 2014, now Pat. No. 9,049,406, which is a continuation of application No. 13/587,962, filed on Aug. 17, 2012, now Pat. No. 8,856,824, which is a continuation of application No. 11/712,249, filed on Feb. 28, 2007, now Pat. No. 8,272,008.

(51) Int. Cl.
| | |
|---|---|
| *H04N 21/233* | (2011.01) |
| *H04N 21/235* | (2011.01) |
| *H04N 21/43* | (2011.01) |
| *H04N 21/435* | (2011.01) |
| *H04N 21/439* | (2011.01) |
| *H04N 21/475* | (2011.01) |
| *H04N 21/482* | (2011.01) |
| *H04N 21/81* | (2011.01) |
| *H04L 29/06* | (2006.01) |
| *H04N 21/44* | (2011.01) |
| *H04N 21/462* | (2011.01) |
| *H04N 21/84* | (2011.01) |
| *H04N 21/8547* | (2011.01) |
| *H04N 5/265* | (2006.01) |
| *H04N 5/44* | (2011.01) |
| *H04N 21/242* | (2011.01) |
| *H04N 21/432* | (2011.01) |

(52) U.S. Cl.
CPC ......... *H04N 21/8166* (2013.01); *H04N 21/84* (2013.01); *H04N 21/8547* (2013.01); *H04N 21/4325* (2013.01)

(56) References Cited

U.S. PATENT DOCUMENTS

| | | | |
|---|---|---|---|
| 5,055,939 A | 10/1991 | Karamon | |
| 5,202,761 A | 4/1993 | Cooper | |
| 5,387,943 A | 2/1995 | Silver | |
| 5,440,351 A | 8/1995 | Ichino | |
| 5,577,042 A | 11/1996 | McGraw | |
| 5,794,018 A | 8/1998 | Vrvilo et al. | |
| 5,917,557 A | 6/1999 | Toyoda | |
| 6,240,555 B1 | 5/2001 | Shoff et al. | |
| 6,263,505 B1 | 7/2001 | Walker | |
| 6,502,142 B1 | 12/2002 | Rapaich | |
| 6,516,329 B1 | 2/2003 | Smith | |
| 6,630,963 B1 * | 10/2003 | Billmaier | H04H 20/18 348/485 |
| 6,710,815 B1 | 3/2004 | Billmaier | |
| 8,074,251 B2 * | 12/2011 | Aoki | H04N 7/10 725/131 |
| 2001/0035976 A1 | 11/2001 | Poon | |
| 2002/0101442 A1 | 8/2002 | Costanzo | |
| 2003/0025832 A1 | 2/2003 | Swart et al. | |
| 2003/0086015 A1 | 5/2003 | Korhonen | |
| 2004/0100942 A1 * | 5/2004 | Blank | H04L 29/06027 370/352 |
| 2004/0117825 A1 | 6/2004 | Watkins | |
| 2004/0250272 A1 | 12/2004 | Durden et al. | |
| 2005/0027715 A1 | 2/2005 | Casey | |
| 2005/0060753 A1 * | 3/2005 | Lundblad | H04N 5/04 725/100 |
| 2005/0281255 A1 * | 12/2005 | Davies | H04N 21/4307 370/389 |
| 2006/0015903 A1 | 1/2006 | MacBeth et al. | |
| 2006/0130121 A1 | 6/2006 | Candelore et al. | |
| 2006/0156374 A1 * | 7/2006 | Hu | H04N 7/163 725/135 |
| 2007/0094697 A1 | 4/2007 | Weigand | |
| 2007/0130581 A1 * | 6/2007 | Del Sesto | H04N 7/088 725/36 |
| 2007/0157251 A1 | 7/2007 | Shrivastava et al. | |
| 2008/0092201 A1 * | 4/2008 | Agarwal | H04N 7/17318 725/135 |

* cited by examiner

METHODS, SYSTEMS, AND PRODUCTS FOR ALTERNATE AUDIO SOURCES

CROSS-REFERENCE TO RELATED APPLICATIONS

This application is a continuation of U.S. application Ser. No. 14/697,660 filed Apr. 28, 2015 and since issued as U.S. Pat. No. 9,264,586, which is a continuation of U.S. application Ser. No. 14/479,276 filed Sep. 6, 2014 and since issued as U.S. Pat. No. 9,049,406, which is a continuation of U.S. application Ser. No. 13/587,962 filed Aug. 17, 2012 and since issued as U.S. Pat. No. 8,856,824, which is a continuation of U.S. application Ser. No. 11/712,249 filed Feb. 28, 2007 and since issued as U.S. Pat. No. 8,272,008, with all applications incorporated herein by reference in their entireties.

BACKGROUND

Exemplary embodiments generally relate to communications, to interactive video, and to television and, more generally, to selection of multiple sources for audio inputs.

Alternate audio content is desirable. When a user receives audio-visual content (such as a movie, for example), the user may not be satisfied with the audio portion of that content. The audio portion may contain offensive language, undesirable dialog, or an unknown language. A common situation involves televised sporting events. When televised football and baseball are watched, some people prefer to listen to different announcers for the play-by-play action. For whatever reasons, then, a user may prefer to receive and experience an alternate audio source that provides a different language track, sanitized dialog, and/or alternate commentary. What is needed, then, are methods, systems, and products that search and retrieve alternate audio sources for video signals.

SUMMARY

Exemplary embodiments provide methods, systems, and products for searching, retrieving, and synchronizing alternate audio sources. Exemplary embodiments identify alternate audio content that may be separately available from video content. When a user receives and watches a movie, for example, exemplary embodiments permit the user to seek out and retrieve alternate audio content from the Internet, from an AM/FM radio broadcast, or from any other source. When the video content is received, the video content may self-identify one or more alternate audio sources that correspond to the video content. The video content, for example, may be tagged or embedded with websites, server addresses, frequencies, or other information that describe the alternate audio sources. Exemplary embodiments may even automatically query database servers (such as GOOGLE® and YAHOO®) for alternate audio sources that correspond to the video content. Once the user selects an alternate audio source, exemplary embodiments may then synchronize the video content and the separately-available alternate audio content. Because the video content and the alternate audio content may be received as separate streams of data, either of the streams may lead or lag. Exemplary embodiments, then, may also synchronize the separately-received streams of data to ensure a pleasing entertainment experience.

Exemplary embodiments include a method for retrieving an audio signal. A video signal is received that comprises a content identifier and an alternate audio tag. In response to the alternate audio tag, a query is sent for an alternate audio source that corresponds to the content identifier. This query may be automatically generated and sent, or the query may be specifically requested by the viewer. A query result is received that identifies an audio signal that corresponds to the content identifier and that is separately received from the video signal.

More exemplary embodiments include a system for retrieving an audio signal. A video signal is received that comprises a content identifier and an alternate audio tag. In response to the alternate audio tag, a query is sent for an alternate audio source that corresponds to the content identifier. A query result is received that identifies an audio signal that corresponds to the content identifier and that is separately received from the video signal.

Other exemplary embodiments describe a computer program product for retrieving an audio signal. The computer program product has processor-readable instructions for receiving a video signal that comprises a content identifier and an alternate audio tag. In response to the alternate audio tag, a query is sent for an alternate audio source that corresponds to the content identifier. A query result is received that identifies an audio signal that corresponds to the content identifier and that is separately received from the video signal.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
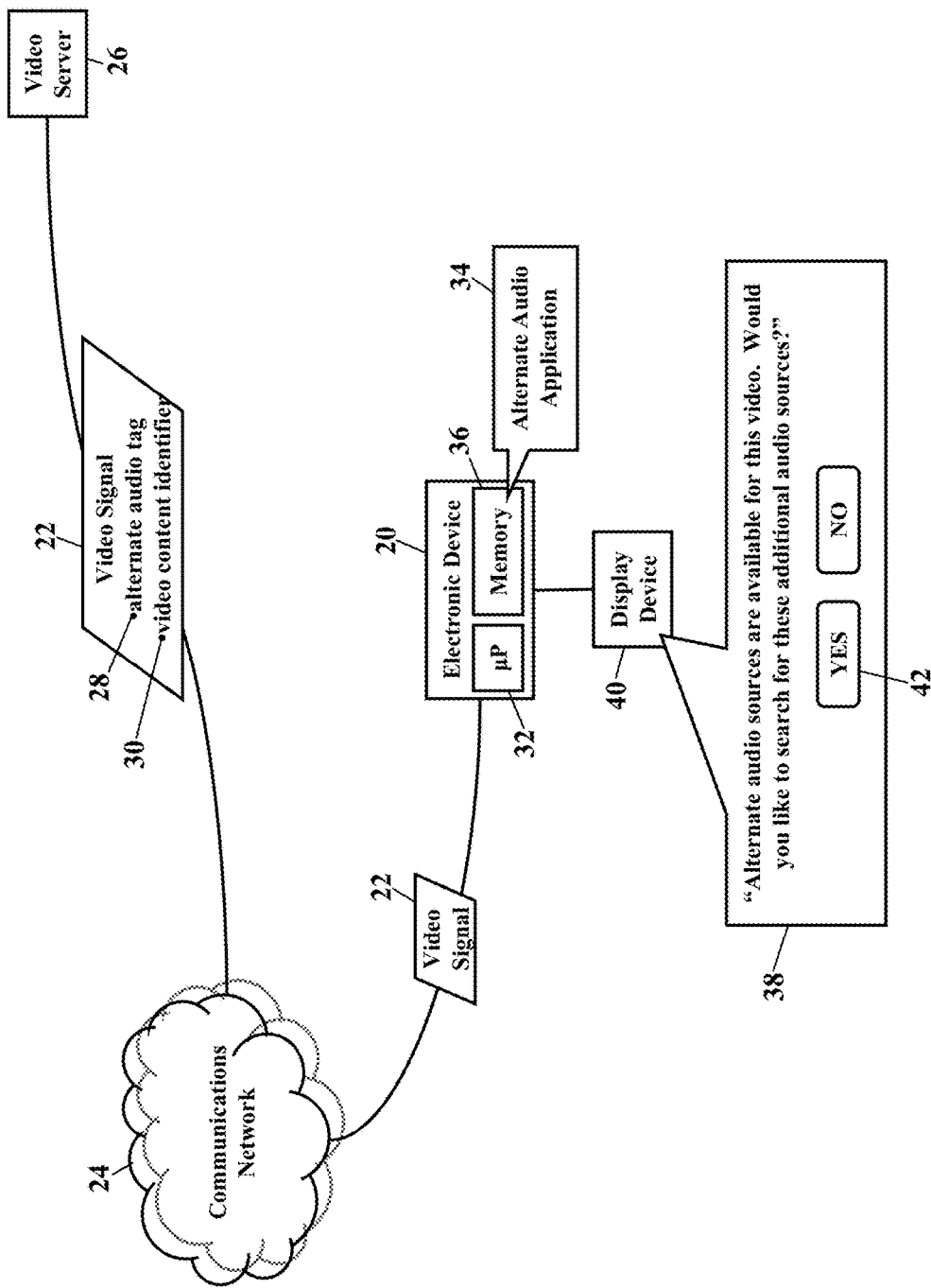
FIG. 1 is a schematic illustrating an operating environment in which exemplary embodiments may be implemented.

FIG. 1 is a schematic illustrating an environment in which exemplary embodiments may be implemented. A user's electronic device 20 receives a video signal 22 from a communications network 24. The video signal 22 may be a movie, sporting event, or any other content. The video signal 22 may originate, or be received from, any source, such as a video server 26. The video signal 22 may have any formatting, and the video signal 22 may be unicast, multicast, or broadcast to the electronic device 20. The video signal 22 may also originate from a local source, such as a DVD player, a digital or analog recorder, local memory, or other local source that may be accessible without the communications network 24. Although the electronic device 20 is generically shown, the electronic device 20, as will be later explained, may be a computer, a radio, a set-top receiver, a personal digital assistant (PDA), a cordless/cellular/IP phone, digital music player, or any other processor-controlled device.

The video signal 22 may include an alternate audio tag 28. According to exemplary embodiments, the alternate audio tag 28 may be any information that identifies alternate audio sources for the video signal 22. The video signal 22 may include, or be received with, audio content or portions (such as an audio track to a movie). The user, however, may wish to experience an alternate audio source that is not sent with the video signal 22. The alternate audio source, for example, may be a different language track, sanitized dialog, an AM or FM radio broadcast, and/or alternate commentary. These alternate audio sources, in general, may be any audio signal that is separately received from the video signal 22. As FIG. 1 illustrates, the video signal 22, and/or alternate audio tag 28, may include a video content identifier 30. The video content identifier 30 may be any identification number, title, code, or other data that uniquely describes the content associated with the video signal 22. The alternate audio tag 28 may be embedded within the video signal 22 (or otherwise associated with the video signal 22) to alert or notify users of these alternate audio sources.

The user's electronic device 20 receives the video signal 22. The user's electronic device 20 also receives the alternate audio tag 28 and/or the video content identifier 30. The user's electronic device 20 comprises a processor 32 (e.g., "μP"), application specific integrated circuit (ASIC), or other similar device that may execute an alternate audio application 34 stored in memory 36. According to exemplary embodiments, the alternate audio application 34 comprises processor-executable instructions that may inspect the video signal 22 for the alternate audio tag 28 or otherwise identify the associated alternate audio tag 28. The presence of the alternate audio tag 28 notifies the alternate audio application 34 that alternate audio sources may exist for the video signal 22. When the alternate audio tag 28 is detected, the alternate audio application 34 may alert the user that alternate audio sources may exist for the video signal 22. The alternate audio application 34, for example, may cause the visual and/or audible presentation of a prompt 38 on a display device 40. The prompt 38 notifies the user that alternate audio sources may exist. When the user wishes to retrieve an alternate audio source, the user may affirmatively select a control 42, thus authorizing the alternate audio application 34 to query for the alternate audio sources.

Figure 2:
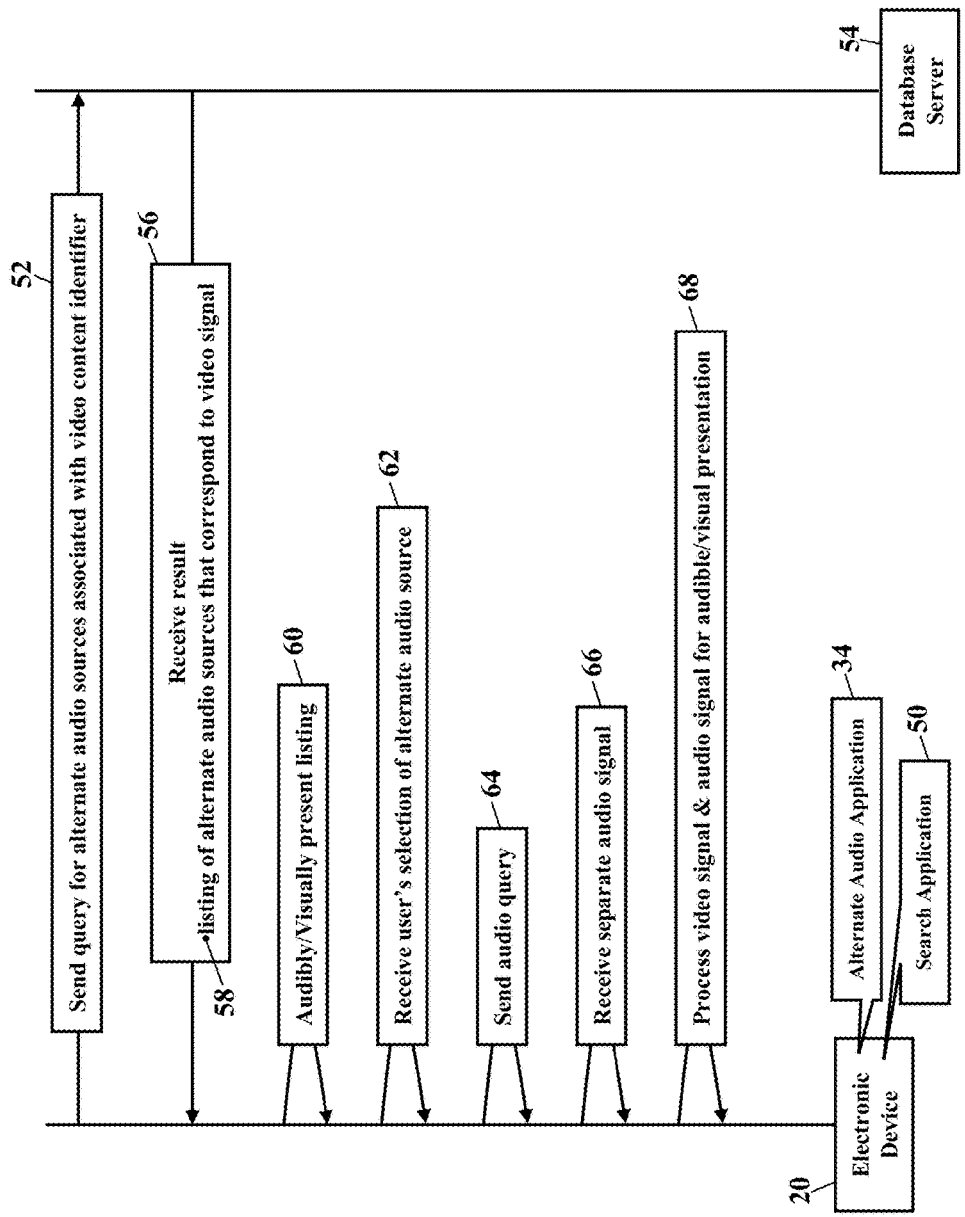
FIG. 2 is a schematic illustrating a process for retrieving alternate audio sources, according to more exemplary embodiments.

FIG. 2 is a schematic illustrating a process for retrieving alternate audio sources, according to more exemplary embodiments. When the user wishes to retrieve an alternate audio source, the user affirmatively responds to the prompt (shown as reference numeral 38 in FIG. 1). The alternate audio application 34 may call or invoke a search application 50 to issue or send a query for any alternate audio sources associated with the video content identifier (Step 52). The query may communicate (via the communications network 24 illustrated in FIG. 1) to a database server 54 (such as a YAHOO® or GOOGLE® server). The query may additionally or alternatively communicate to other devices in the vicinity of the user's electronic device 20. The query, for example, may be sent via an infrared, BLUETOOTH®, WI-FI®, or other coupling to other devices within the user's social network.

A response is then received (Step 56). The response includes a query result that may include or describe a listing 58 of one or more alternate audio sources that may correspond to the video signal 22. The listing 58, for example, may describe one or more websites or network addresses that provide an alternate, simulcast or archived audio signal to accompany the video signal 22. The listing 58 may describe one or more radio stations that broadcast an alternate audio signal (such as alternate announcers for a sporting event). The listing 58 may include real-time or archived podcasts from a member of an audience. The listing 58 may also include alternate audio sources obtainable from members of the user's social network.

The listing 58 is presented to the user (Step 60). The search application 50 and/or the alternate audio application 34 may cause the listing 58 to be displayed on the display device (illustrated as reference numeral 40 in FIG. 1). The user may then select an alternate audio source from the listing 58, and that selection is received (Step 62). According to exemplary embodiments, the alternate audio application 34 causes an audio query to be sent for the selected alternate audio source (Step 64). The audio query communicates (via the communications network 24 illustrated in FIG. 1) to a communications address associated with a source of the selected alternate audio source. The audio query, for example, may communicate to an audio server. An audio signal is then received at the user's electronic device 20 (Step 66). If the alternate audio source is a terrestrial AM or FM radio station signal, then the user's electronic device 20 may be tuned to the corresponding frequency (as later paragraphs will explain).

The user's electronic device 20 then processes signals. The user's electronic device 20 thus receives the video signal (illustrated as reference numeral 22 in FIG. 1) and also receives the separate, audio signal. The video signal and the audio signal may thus be separately received as separate streams of data. The user's electronic device 20 then processes the video signal and the audio signal for visual and audible presentation (Step 68).

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum, any modulation technique, and/or any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 3:
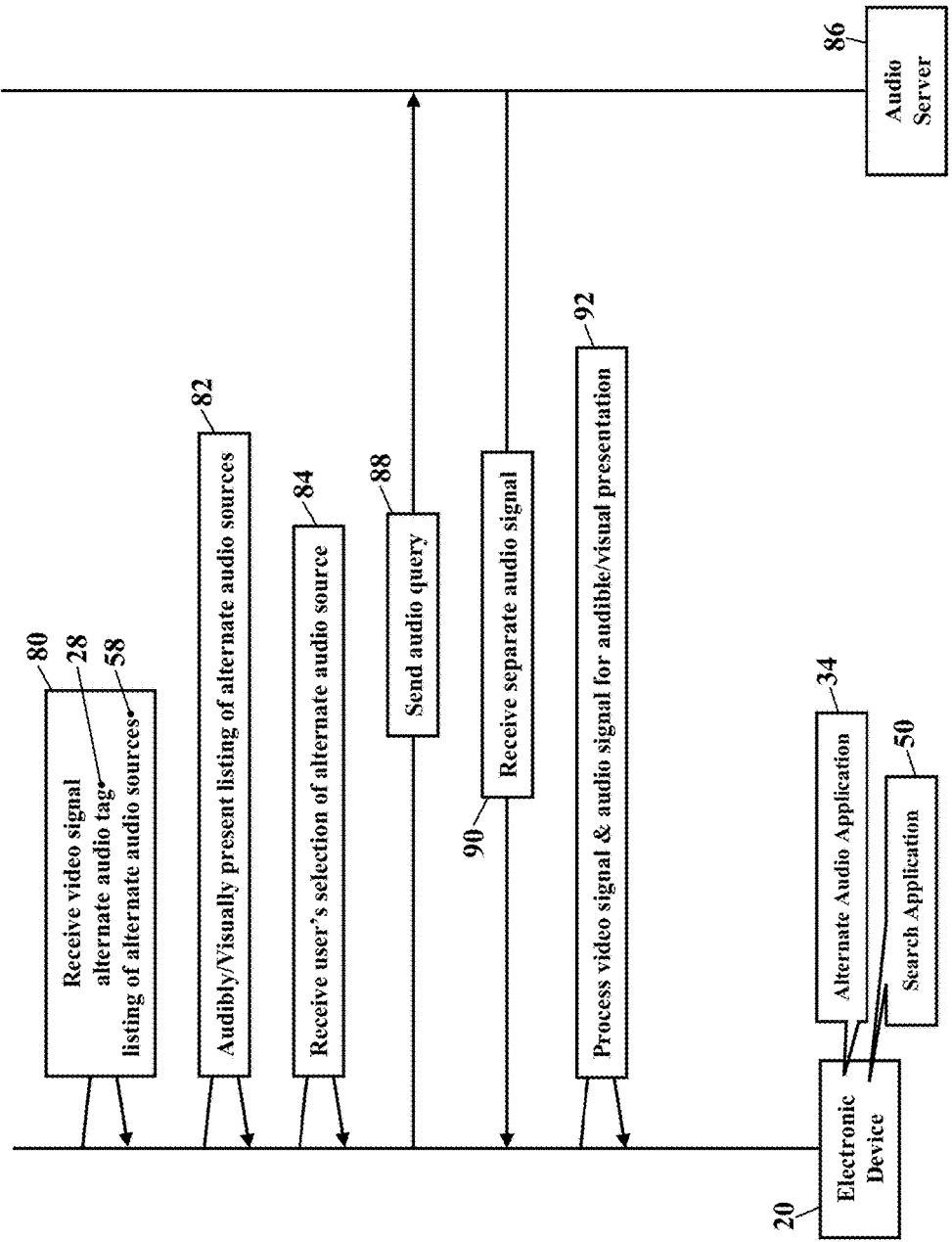
FIG. 3 is a schematic further illustrating a process for retrieving alternate audio, according to more exemplary embodiments.

FIG. 3 is a schematic further illustrating a process for retrieving alternate audio, according to more exemplary embodiments. Here, when the video signal (illustrated as reference numeral 22 in FIG. 1) is received (Step 80), the video signal may also identify the alternate audio sources. That is, when the alternate audio tag 28 is received, the listing 58 of one or more alternate audio sources may also be embedded or encoded within the video signal and/or the alternate audio tag 28. Alternatively, the listing 58 may be separately retrieved via a database query using the video content identifier 30. A content provider of the video signal, for example, may configure the video signal to self-identify the alternate audio sources. The video signal may include information that identifies a website or server address that provides an alternate language track or a different dialog. The content provider may identify radio stations providing different announcers for a football game, political convention, or background music. Again, whatever the alternate audio sources, the listing 58 may be embedded or encoded within the video signal and/or the alternate audio tag 28.

The user's electronic device 20 receives the alternate audio tag 28. The presence of the alternate audio tag 28 again notifies the alternate audio application 34 that alternate audio sources may exist for the video signal. The alternate audio application 34 may visually and/or audibly present the listing 58 already received from the video signal (Step 82). The user may select an alternate audio source from the listing 58, and the alternate audio application 34 receives that selection (Step 84). The alternate audio application 34 sends the audio query to the source of the selected alternate audio source (e.g., an audio server 86) (Step 88). The audio server 86 sends the separate audio signal (Step 90). The user's electronic device 20 thus receives the video signal and also receives the separate, audio signal. The user's electronic device 20 then processes the video signal and the audio signal for visual and audible presentation (Step 92).

Figure 4:
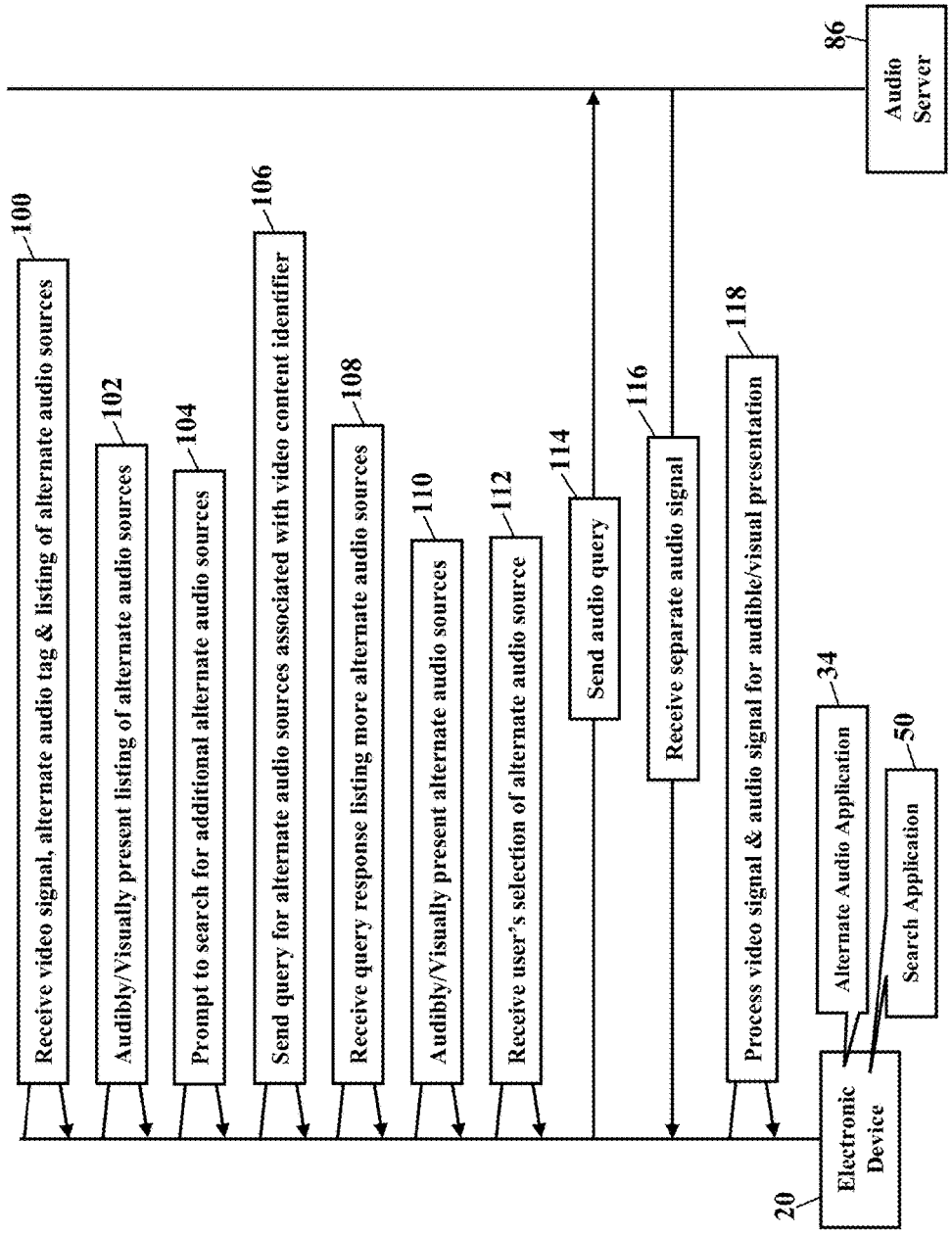
FIG. 4 is a schematic illustrating additional queries for alternate audio sources, according to more exemplary embodiments.

FIG. 4 is a schematic illustrating additional queries for alternate audio sources, according to more exemplary embodiments. Because FIG. 4 is similar to FIGS. 2 and 3, FIG. 4 is only briefly described. When the video signal is received (Step 100), the video signal may also include the alternate audio tag and the listing of alternate audio sources. The listing of alternate audio sources is presented to the user (Step 102). Here, even though the content provider may embed or provide the listing of alternate audio sources, the user may still wish to query for other alternate audio sources. The alternate audio sources identified in the listing, for example, may not appeal to the user. The user may, instead, wish to conduct a search for additional alternate audio sources not identified in the listing. The alternate audio application 34, then, may prompt to search for alternate audio sources, despite the listing (Step 104). When the user affirmatively responds to the prompt, the alternate audio application 34 is authorized to query for additional alternate audio sources. The alternate audio application 34 calls or invokes the search application 50 and sends the query for any alternate audio sources associated with the video content identifier (Step 106). A response to the query is received (Step 108), and the query result describes more alternate audio sources that may correspond to the same video content identifier.

The alternate audio sources are then presented (Step 110). The user may select any alternate audio source from the listing or from the query result. The user's selection is received (Step 112) and the audio query is sent to the source (e.g., the audio server 86) (Step 114). The separate audio signal is received (Step 116) and processed along with the video signal (Step 118).

Figure 5:
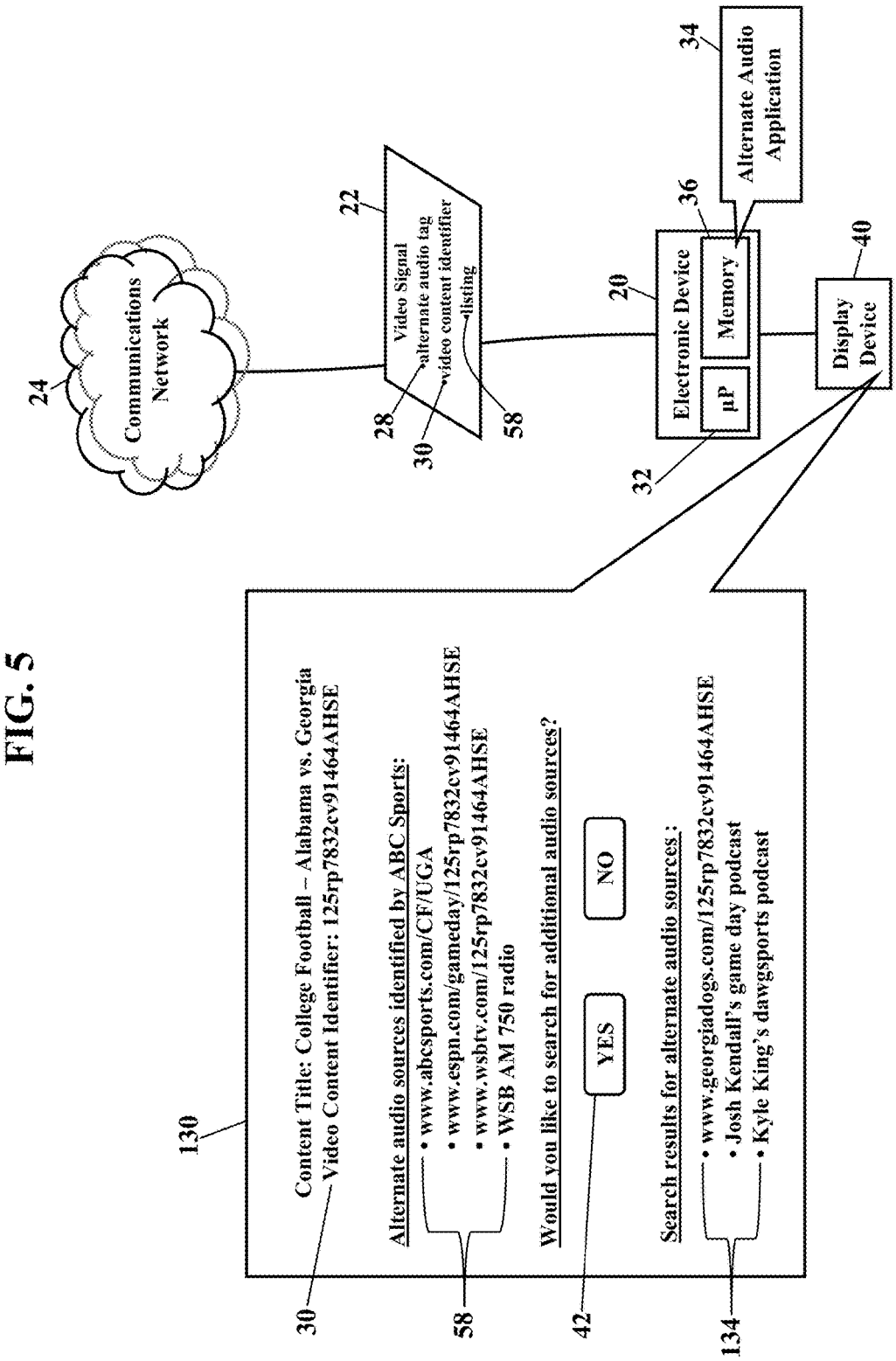
FIG. 5 is a schematic illustrating a user interface for retrieving alternate audio sources, according to more exemplary embodiments.

FIG. 5 is a schematic illustrating a user interface for retrieving alternate audio sources, according to more exemplary embodiments. According to exemplary embodiments, the alternate audio application 34 causes the processor 32 to graphically present a user interface 130 on the display device 40. When the video signal 22 includes the listing 58, the user interface 130 may present the listing 58 to the user. The user is thus informed of alternate audio sources embedded or encoded within the video signal 22. The user, however, may wish to search for additional alternate audio sources not identified in the listing 58. The user interface 130, then, may include the control 42 to search for additional audio sources. When the user selects the control 42, the alternate audio application 34 may invoke the search application (illustrated as reference numeral 50 in FIGS. 2-4) and query for alternate audio sources associated with the video content identifier 30. When the search results are received, the user interface 130 may visually present those additional audio sources 134. The user may then select a desired alternate audio source from the alternate audio sources provided by the listing 58 and/or from the additional alternate audio sources found by invoking the search application 50. The desired alternate audio source is retrieved and processed.

Figure 6:
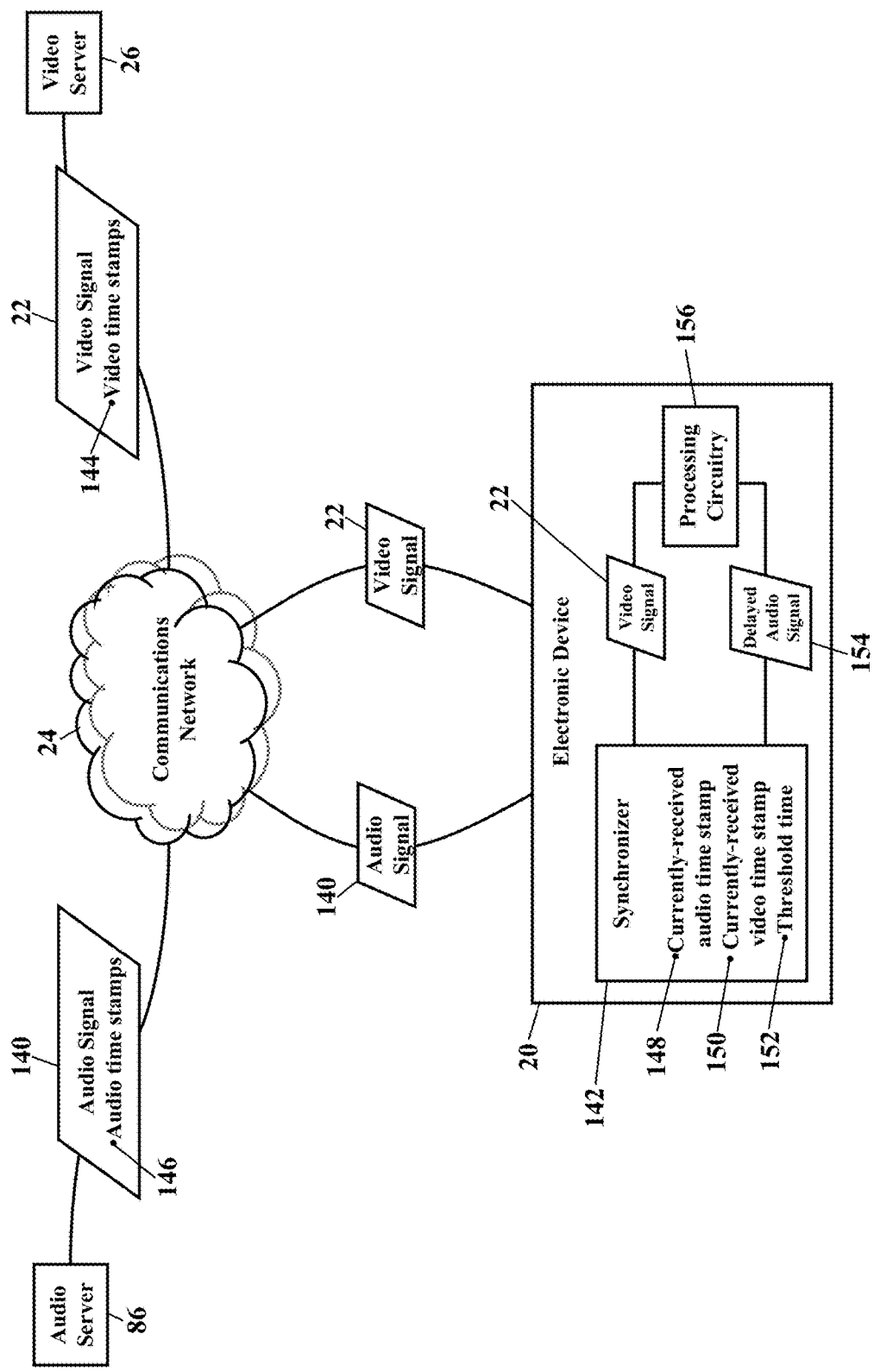
FIGS. 6 and 7 are schematics illustrating synchronization of signals, according to more exemplary embodiments.

FIG. 6 is a schematic illustrating synchronization of signals, according to more exemplary embodiments. Now that the user has selected an alternate audio source, the user's electronic device 20 may receive the video signal 22 and the separate audio signal 140. The video signal 22 may communicate from the video server 26 via the communications network 24. According to exemplary embodiments, the separate audio signal 140 communicates from a separate source, such as the audio server 86. The video signal 22 and/or the audio signal 140 may be unicast, multicast, or broadcast to the electronic device 20. The video signal 22 and the audio signal 140 may thus be separately received as separate streams of data.

The audio signal 140 and the video signal 22 may need synchronization. When the audio signal 140 and the video signal 22 correspond to the same content, propagation delays in the communications network 24 may cause the video signal 22 and/or the audio signal 140 to lead or lag. The video signal 22, for example, may contain more bits or information than the audio signal 140, so the video signal 22 may propagate more slowly through the communications network 24. Whatever the causes, though, the audio signal 140 and the video signal 22 may be unsynchronized. When the audio signal 140 and the video signal 22 correspond to the same content, then the audio portion of the content may be out-of-synchronization with the video portion. The electronic device 20, then, may synchronize the audio signal 140 and the video signal 22 to help ensure the content is enjoyed as intended.

A synchronizer 142 may be invoked. The synchronizer 142 may be a component of the electronic device 20 that causes synchronization of the audio signal 140 and the video signal 22. As later paragraphs will explain, the synchronizer 142 may be circuitry, programming, or both. The synchronizer 142, for example, may compare time stamps and/or markers. As FIG. 6 illustrates, the video signal 22 may include one or more video time stamps 144. The video time stamps 144 mark or measure an amount of time from a reference point or time. The video time stamps 144, for example, may signify an offset time from the start of a file, program, or the video signal 22. Some or all frames in the video signal 22 may have corresponding time stamps that measure when a frame occurs with reference to the start of the file, program, or the video signal 22.

The electronic device 20 may also receive audio time stamps 146. When the audio signal 140 is received, the audio time stamps 146 may be encoded within the audio signal 140. The audio time stamps 146 mark or measure an amount of time from a reference point or time. The audio time stamps 146 may signify an offset time from the start of a file, program, or the audio signal 140. The audio time stamps 146 mark or measure when portions of the audio signal 140 occur with reference to the start of the file, program, or the audio signal 140.

The synchronizer 142 may compare the audio time stamps 146 to the video time stamps 144. When a currently-received audio time stamp 148 exceeds a currently-received video time stamp 150, then the synchronizer 142 may delay the audio signal 140. The synchronizer 142 may subtract the currently-received video time stamp 150 from the currently-received audio time stamp 148. That difference is compared to a threshold time 152. The threshold time 152 is any configurable time at which timing lag (or lead) in the video signal 22 is unacceptable. When the difference between the currently-received audio time stamp 148 and the currently-received video time stamp 150 equals and/or exceeds the threshold time 152, then the synchronizer 142 may delay the audio signal 140. The synchronizer 142 may even compare the absolute value of the difference to the threshold time 152. The synchronizer 142 continues to compare the successively-received audio time stamps 146 to the successively-received video time stamps 144 until the difference is within the threshold time 152. The synchronizer 142 then releases a delayed audio signal 154 for subsequent processing. The delayed audio signal 154, for example, may be processed by processing circuitry 156 for audible presentation. The video signal 22 may also be processed by the processing circuitry 156 for visual presentation. Because the audio signal 140 has been delayed, though, exemplary embodiments synchronize the delayed audio signal 154 and the video signal 22 to help ensure the content is enjoyed.

The synchronizer 142 may additionally or alternatively utilize markers. The video signal 22 and/or the audio signal 140 may include or be associated with markers. These markers may or may not be based on time stamps. These markers represent and/or identify an event within the video signal 22 and/or the audio signal 140. A marker, for example, may identify a scene, a transition, a beginning of a new segment, and/or some other occurrence in the video signal 22 and/or the audio signal 140. For example, a marker may identify a kick-off of a football game, a transition from one scene to another in a movie, or some other occurrence. The synchronizer 142 may compare the video signal 22 and/or the audio signal 140 for similar markers. When a lead condition is detected, the leading signal may be delayed for synchronization.

Some aspects of synchronization are known, so this disclosure will not greatly explain the known details. If the reader desires more details, the reader is invited to consult the following sources, all incorporated herein by reference in their entirety: U.S. Pat. No. 4,313,135 to Cooper; U.S. Pat. No. 4,839,733 to Karamon, et al.; U.S. Pat. No. 5,055,939 to Karamon, et al.; U.S. Pat. No. 5,202,761 to Cooper; U.S. Pat. No. 5,387,943 to Silver; U.S. Pat. No. 5,440,351 to Ichino; U.S. Pat. No. 5,577,042 to McGraw, Sr., et al.; U.S. Pat. No. 5,917,557 to Toyoda; U.S. Pat. No. 6,263,505 to Walker, et al.; U.S. Pat. No. 6,502,142 to Rapaich; U.S. Pat. No. 6,630,963 to Billmaier; U.S. Pat. No. 6,710,815 to Billmaier; U.S. Patent Application Publication 2002/0101442 to Costanzo, et al.; U.S. Patent Application Publication 2003/0086015 to Korhonen, et al.; U.S. Patent Application Publication 2004/0117825 to Watkins; and U.S. Patent Application Publication 2005/0027715 to Casey, et al.

Figure 7:
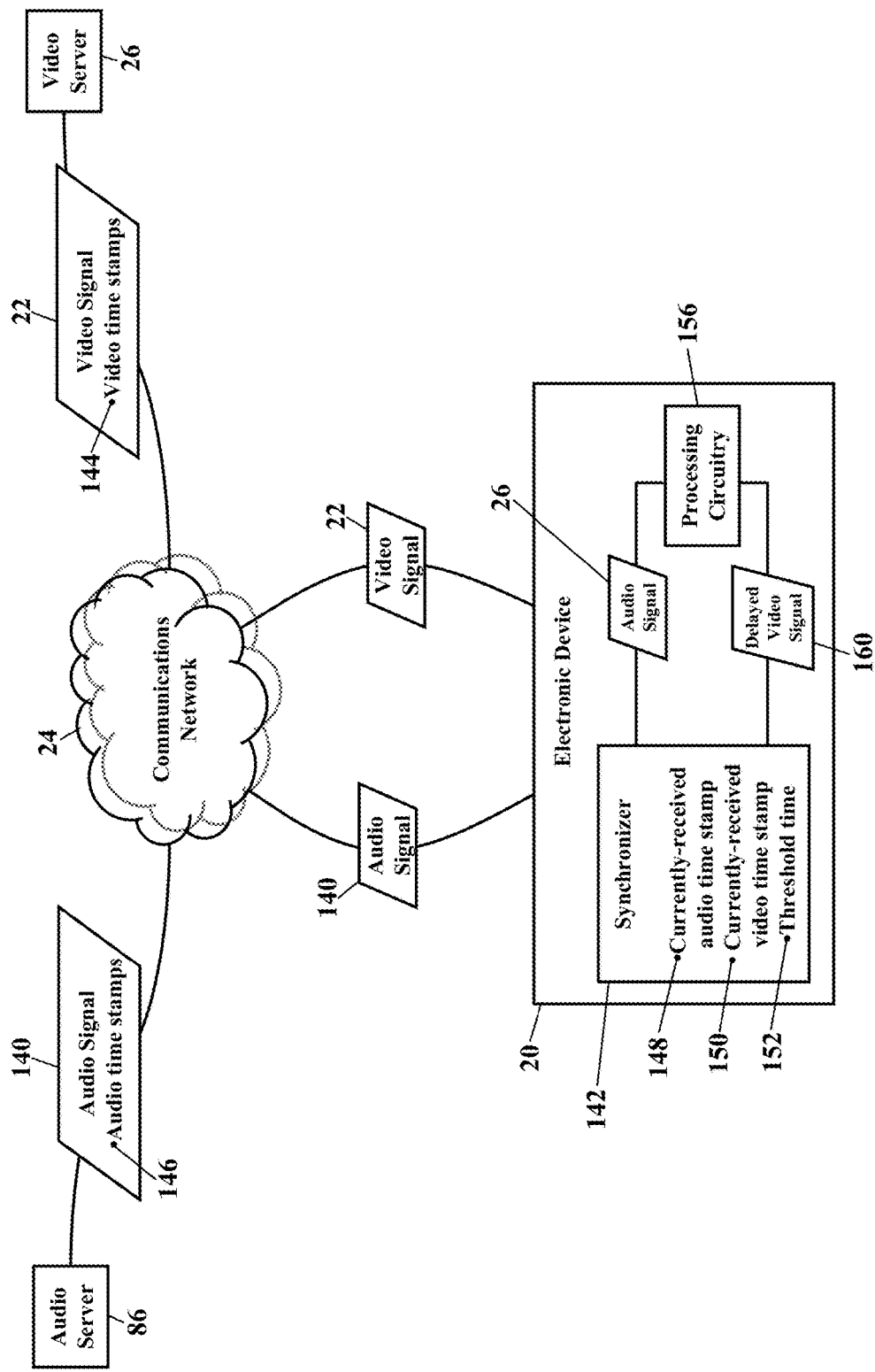

FIG. 7 is a schematic illustrating a delay of the video signal 22, according to more exemplary embodiments. Here, for whatever reason, the video signal 22 may lead the audio signal 140. That is, when the audio signal 140 lags the video signal 22, exemplary embodiments may delay the video signal 22. The synchronizer 142 may again compare the audio time stamps 146 to the video time stamps 144. When the currently-received video time stamp 150 exceeds the currently-received audio time stamp 148, then the synchronizer 142 may delay the video signal 22. The synchronizer 142 may subtract the currently-received audio time stamp 148 from the currently-received video time stamp 150 and compare that difference to the threshold time 152. When the difference equals and/or exceeds the threshold time 152, then the synchronizer 142 may delay the video signal 22. The synchronizer 142 continues to compare the successively-received video time stamps 144 to the successively-received audio time stamps 146 until the difference is within the threshold time 152. The synchronizer 142 then releases a delayed video signal 160 for subsequent processing. The processing circuitry 156 processes the audio signal 140 and/or the delayed video signal 160 for audible/visual presentation. The audio signal 140 and the delayed video signal 160 are thus synchronized to help ensure the content is enjoyed.

Figure 8:
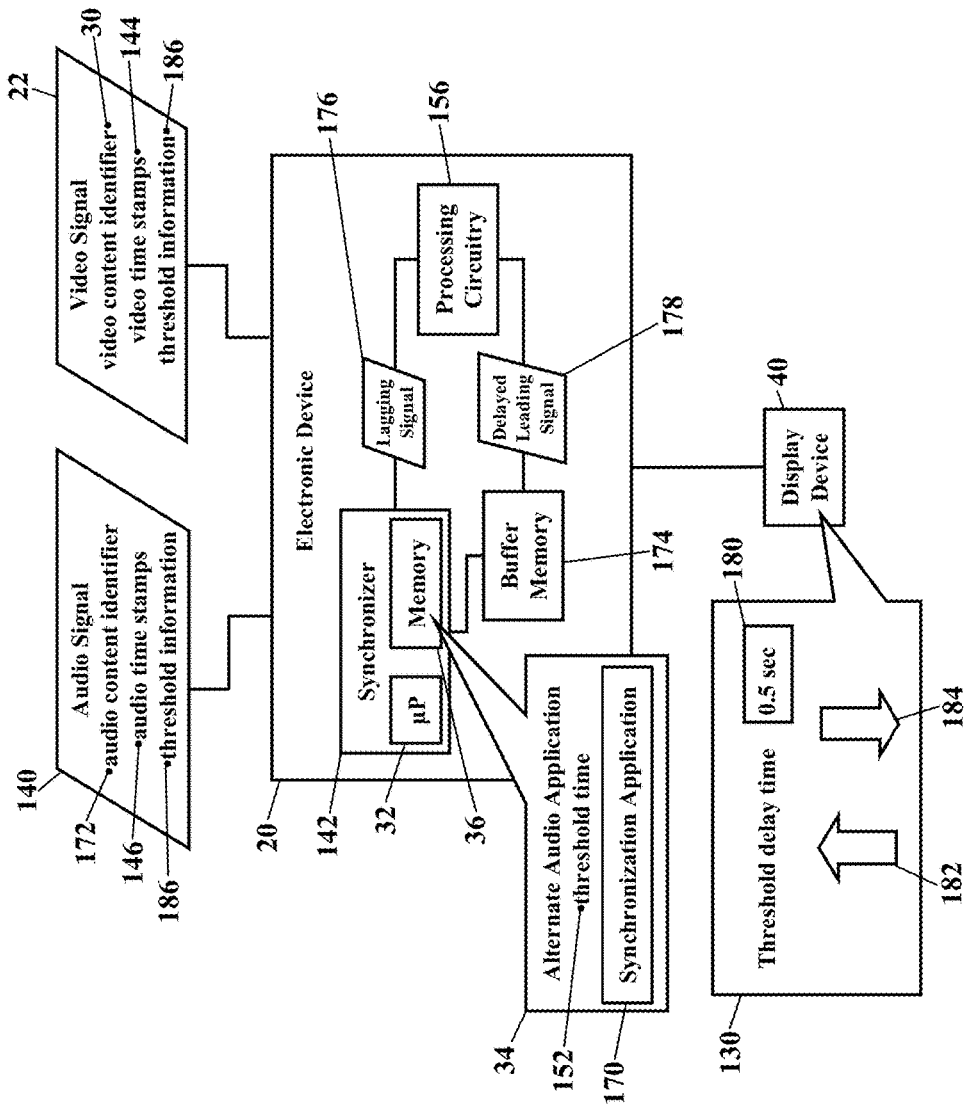
FIG. 8 is a schematic illustrating an electronic device, according to more exemplary embodiments.

FIG. 8 is a schematic further illustrating the electronic device 20, according to more exemplary embodiments. Here the synchronizer 142 comprises the processor 32, and the processor 32 executes a synchronization application 170. The synchronization application 170 is illustrated as a module or sub-component of the alternate audio application 34. The synchronization application 170, however, may be a separate application that stores in the memory 36 and cooperates with the alternate audio application 34. The synchronization application 170 may even be remotely stored and accessed at some location within the communications network (illustrated as reference numeral 24 in FIG. 1). Regardless, the synchronization application 170 comprises processor-executable instructions that determine when synchronization is needed between the received audio signal 140 and the received video signal 22, according to exemplary embodiments. When synchronization is needed, the synchronization application 170 synchronizes the video signal 22 and the separately-received audio signal 140.

The synchronization application 170 may first determine when synchronization is desired. When the audio signal 140 and the video signal 22 correspond to the same content, synchronization may be desired. If, however, the audio signal 140 and the video signal 22 are unrelated, then perhaps synchronization is unnecessary. The synchronization application 170, then, may inspect for content identifiers. As FIG. 8 illustrates, when the audio signal 140 is received, the audio signal 140 may include an audio content identifier 172. The audio content identifier 172 may be any information that describes the audio signal 140. The audio content identifier 172, for example, may be any identification number, title, code, or other alphanumeric string that uniquely describes the audio signal 140. Likewise, when the video signal 22 is received, the synchronization application 170 may inspect the video signal 22 for the video content identifier 30. The video content identifier 30 may be any identification number, title, code, information, or alphanumeric string that uniquely describes the video signal 22.

The synchronization application 170 may then compare the audio content identifier 172 to the video content identifier 30. If the audio content identifier 172 matches the video content identifier 30, then the audio signal 140 and the video signal 22 likely correspond to the same content. If even some portion of the audio content identifier 172 matches the video content identifier 30 (or vice versa), then the audio signal 140 and the video signal 22 may still correspond to the same content. The synchronization application 170 may thus confirm that the audio signal 140 and the video signal 22 should be synchronized. If the synchronization application 170 observes no similarity, or an insubstantial amount of similarity, in the audio content identifier 172 and the video content identifier 30, then synchronization application 170 may decline to synchronize. Regardless, a user may configure the synchronization application 170 to start, or to stop, synchronization as needed, despite dissimilar content identifiers.

Once synchronization is determined to be needed and/or desired, the synchronization application 170 may ensure the content remains pleasing and enjoyable. The synchronization application 170 reads, extracts, or otherwise obtains the audio time stamps 146 and the video time stamps 144 and makes a comparison. Whenever a lead or a lag condition is detected, the synchronization application 170 may instruct the processor 32 to divert the leading signal to a buffer memory 174. The buffer memory 174 may store the leading signal in a first in, first out (FIFO) fashion. As the leading signal accumulates in the buffer memory 174, the leading signal is delayed in comparison to a lagging signal 176. A delayed signal 178 may then be retrieved from the buffer memory 174 and processed by the processing circuitry 156. So, regardless of whether the video signal 22 or the audio signal 140 leads, the buffer memory 174 may cause a delay, thus synchronizing the audio and video portions.

FIG. 8 also illustrates user-configuration of the threshold time 152, according to more exemplary embodiments. Because the threshold time 152 is configurable, the threshold time 152 may be specified by a user of the electronic device 20, according to exemplary embodiments. The user interface 130, for example, may permit changing or entering the threshold time 152. The user interface 130 allows the user to alter the threshold time 152 and, thus, manually set or establish any delay caused by the synchronizer 142. The user interface 130, for example, may have a data field 180 into which the user enters the threshold time 152. The threshold time 152 may be expressed in any measurement and/or in any increment of time, from zero delay to seconds, minutes, or even hours of delay. The user interface 130 may additionally or alternatively include a first timing control 182 for increasing the threshold time 152. A second timing control 184 may be used to decrease the threshold time 152. The user interface 130 may additionally or alternatively include a graphical or physical rotary knob, slider, button, or any other means of changing the threshold time 152.

The threshold time 152 may be specified by a content provider. A provider of the video signal 22, for example, may include threshold information 186 within the video signal 22. The threshold information 186 is then used to define, derive, or specify the threshold time 152. The threshold information 186, for example, may be embedded or encoded within the video signal 22. When the video signal 22 is received, exemplary embodiments may then obtain, read, and/or extract the threshold information 186. The provider of the video signal 22 may thus specify the threshold time 152 and determine how much asynchronism is tolerable between the video signal 22 and the corresponding (but separately received) audio signal 140. A content provider, for example, may encode 500 millisecond as the threshold information 186 within the video signal 22. When a lead or lag condition exceeds 500 milliseconds, then the synchronization application 170 instructs the processor 32 to delay the audio signal 140, the video signal 22, or both. Similarly, the threshold information 186 may be embedded or encoded within, or modulated onto, the audio signal 140, and the synchronization application 170 causes a delay when needed. If the audio signal 140 and the video signal 22 both include the threshold information 186, then the synchronization application 170 may have authority to choose one or the other. When the audio signal 140 specifies a first threshold information, while the video signal 22 specifies another, second threshold information, then the synchronization application 170 may choose the smaller value to minimize asynchronous conditions.

Figure 9:
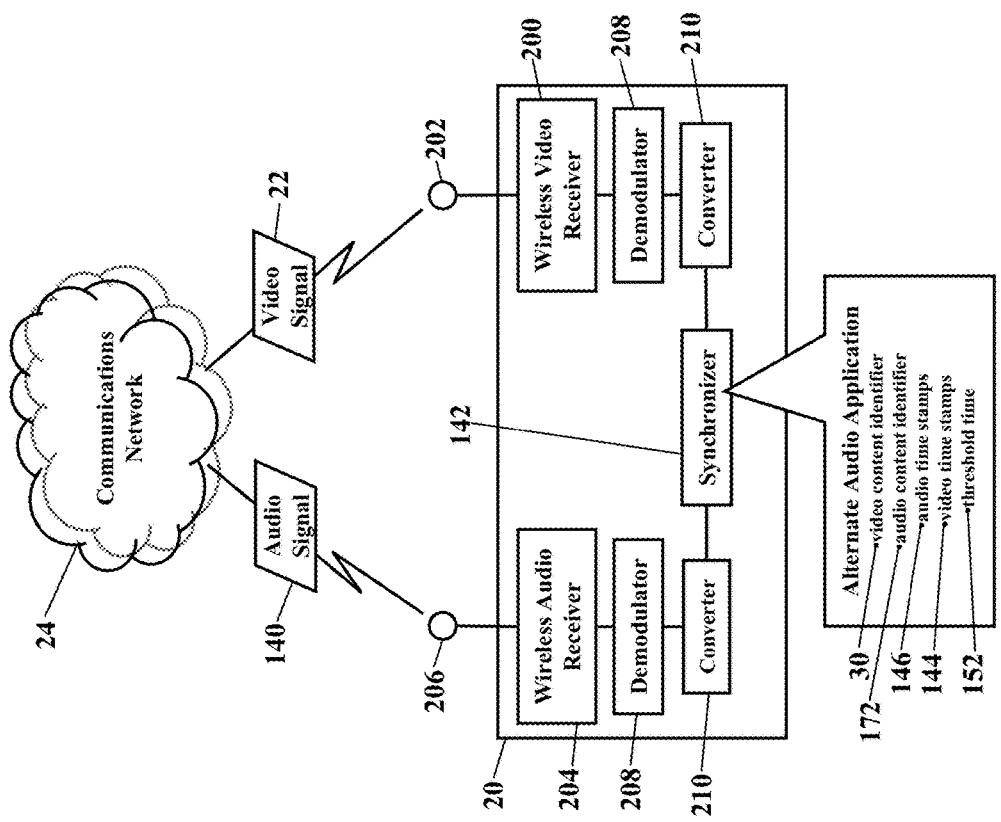
FIGS. 9-14 are schematics illustrating additional operating environments in which exemplary embodiments may be implemented.

FIG. 9 is a schematic illustrating another operating environment in which exemplary embodiments may be implemented. The electronic device 20 again receives the video signal 22 and the separate audio signal 140. Here, however, the video signal 22 and/or the audio signal 140 are terrestrially broadcast at some frequency of any portion of the electromagnetic spectrum. The audio signal 140, for example, may be wirelessly broadcast from an antenna coupled to the communications network 24. The audio signal 140 may be wirelessly transmitted using any signaling standard (such as the I.E.E.E. 802 family of standards, GSM/CDMA/TDMA or any cellular standard, WI-FI®, and/or the ISM band). The video signal 22, too, may be received via wireless or wired communication. Regardless, the video signal 22 and the audio signal 140 may be separately received as separate streams of data.

According to exemplary embodiments, the electronic device 20 includes at least one wireless receiver. A wireless video receiver 200, for example, couples to an antenna 202 and wirelessly receives the video signal 22 at some frequency of any portion of the electromagnetic spectrum. A wireless audio receiver 204 may couple to another antenna 206 and wirelessly receives the audio signal 140 at some frequency of any portion of the electromagnetic spectrum. If the audio signal 140 and/or the video signal 22 is/are modulated, the electronic device 20 may include one or more demodulators 208. If analog or digital conversion is needed, the electronic device 20 may include an A/D or D/A converter 210. If synchronization is needed, the synchronizer 142 delays the leading video signal 22 and/or the audio signal 140. Analog and/or digital broadcasting techniques and circuitry are well known, so no further discussion is made. If, however, the reader desires a further explanation, the reader is invited to consult the following sources, with each incorporated herein by reference in its entirety: FERRILL LOSEE, RF SYSTEMS, COMPONENTS, AND CIRCUITS HANDBOOK (1997); LEENAERTS ET AL., CIRCUIT DESIGN FOR RF TRANSCEIVERS (2001); JOE CARR, RF COMPONENTS AND CIRCUITS (2002); WOLF-GANG HOEG AND THOMAS LAUTERBACH, DIGITAL AUDIO BROADCASTING (2003); and ANNA RUDIAKOVA AND VLADIMIR KRIZHANOVSKI, ADVANCED DESIGN TECHNIQUES FOR RF POWER AMPLIFIERS (2006).

Exemplary embodiments, as earlier explained, may determine whether synchronization is desired. For example, the audio content identifier 172 is compared to the video content identifier 30. If a partial or full match is found, then a determination may be made that the audio signal 140 and the separately-received video signal 22 likely correspond to the same content. Exemplary embodiments thus confirm that the audio signal 140 and the video signal 22 should be synchronized.

Once synchronization is desired, exemplary embodiments may compare time stamps. The audio time stamps 146 are compared to the video time stamps 144, as explained above. Whenever a lead or a lag condition is detected, exemplary embodiments implement a delay in the audio signal 140, the video signal 22, or both. When, for example, the audio signal 140 is digital, exemplary embodiments may divert the audio signal 140 to the buffer memory (shown as reference numeral 174 in FIG. 8). As the digital audio signal 140 accumulates in the buffer memory, the audio signal 140 is delayed in comparison to the video signal 22. The video signal 22, alternatively or additionally, may similarly be stored in the buffer memory when the video content leads the audio content. Exemplary embodiments then release the buffered audio signal 140 and/or video signal 22 when synchronization is achieved.

Figure 10:
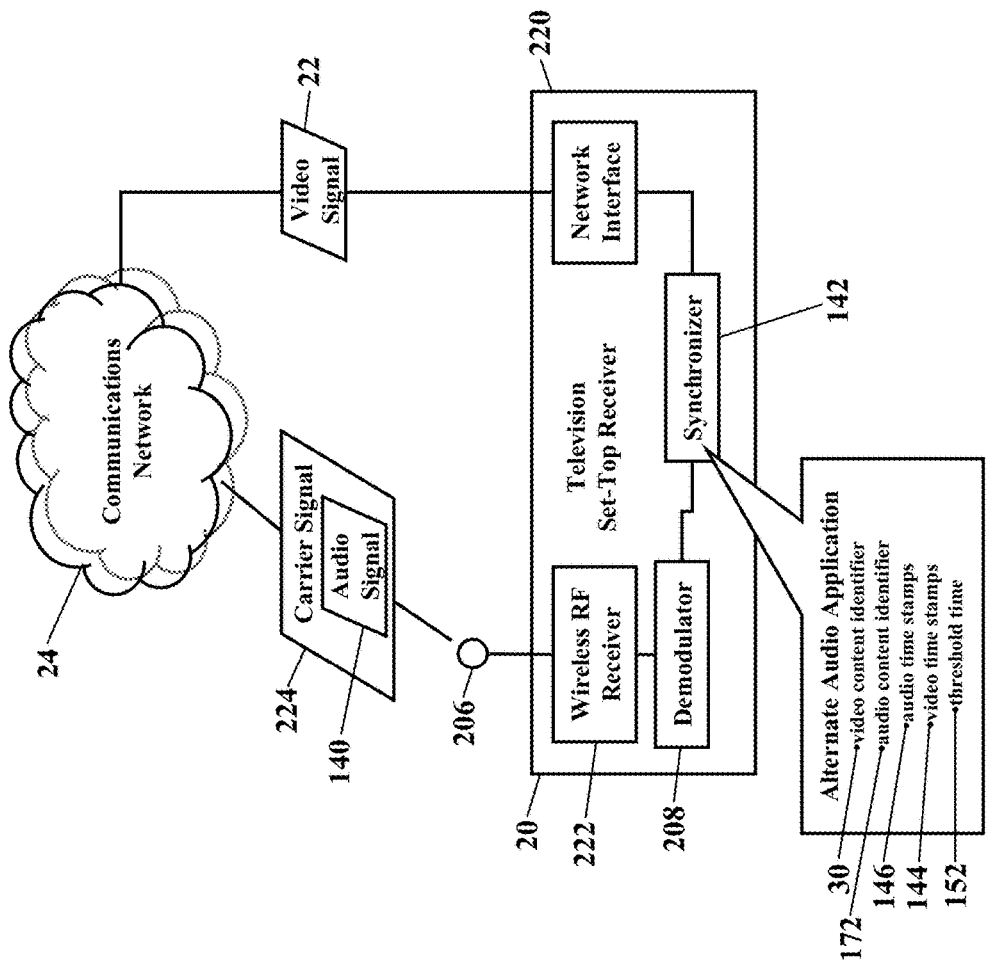

FIG. 10 is a schematic illustrating yet another operating environment in which exemplary embodiments may be implemented. Here the electronic device 20 is illustrated as a television or set-top receiver 220 that receives the video signal 22 and the separate audio signal 140. The video signal may be broadcast along a wireline, cable, and/or satellite portion of the communications network 24, while the audio signal 140 is separately and wirelessly received at an RF receiver 222 as a terrestrial broadcast. While the television or set-top receiver 220 may receive the audio signal 140 at any frequency of any portion of the electromagnetic spectrum, here the audio signal 140 is wirelessly received at the radio-frequency portion of the spectrum. The audio signal 140 may or may not be modulated onto a carrier signal 224. The audio signal 140, for example, may be amplitude modulated or frequency modulated (e.g., AM or FM) onto the carrier signal 224. The audio signal 140 may additionally or alternatively be broadcast from a satellite using any frequency of any portion of the electromagnetic spectrum, and the satellite broadcast may or may not be modulated onto the carrier signal 224. Here, then, the electronic device 20 may be an AM-FM real time television-capable device with broadband capability to wirelessly receive television signals and/or RF audio signals. Regardless, the electronic device 20 may also receive time stamps and content identifiers. The electronic device 20 may receive the video time stamps 144 and the video content identifier 30 encoded within the video signal 22. The electronic device 20 may also receive the audio time stamps 146 and the audio content identifier 172. The audio time stamps 146 and the audio content identifier 172 may be encoded within the audio signal 140 and, if desired, modulated onto the carrier signal 224.

Exemplary embodiments may then proceed as discussed above. The demodulator 208 may demodulate the audio signal 140, the audio time stamps 146, and/or the audio content identifier 172, from the carrier signal 224. Exemplary embodiments may compare the audio content identifier 172 to the video content identifier 30. If a partial or full match is found, then the audio signal 140 and the separately-received video signal 22 may correspond to the same content and may be synchronized. The audio time stamps 146 may be compared to the video time stamps 144, as explained above. When a lead or a lag condition is detected, exemplary embodiments may implement a delay in the audio signal 140, the video signal 22, or both to synchronize the audio signal 140 and the separately-received video signal 22.

Figure 11:
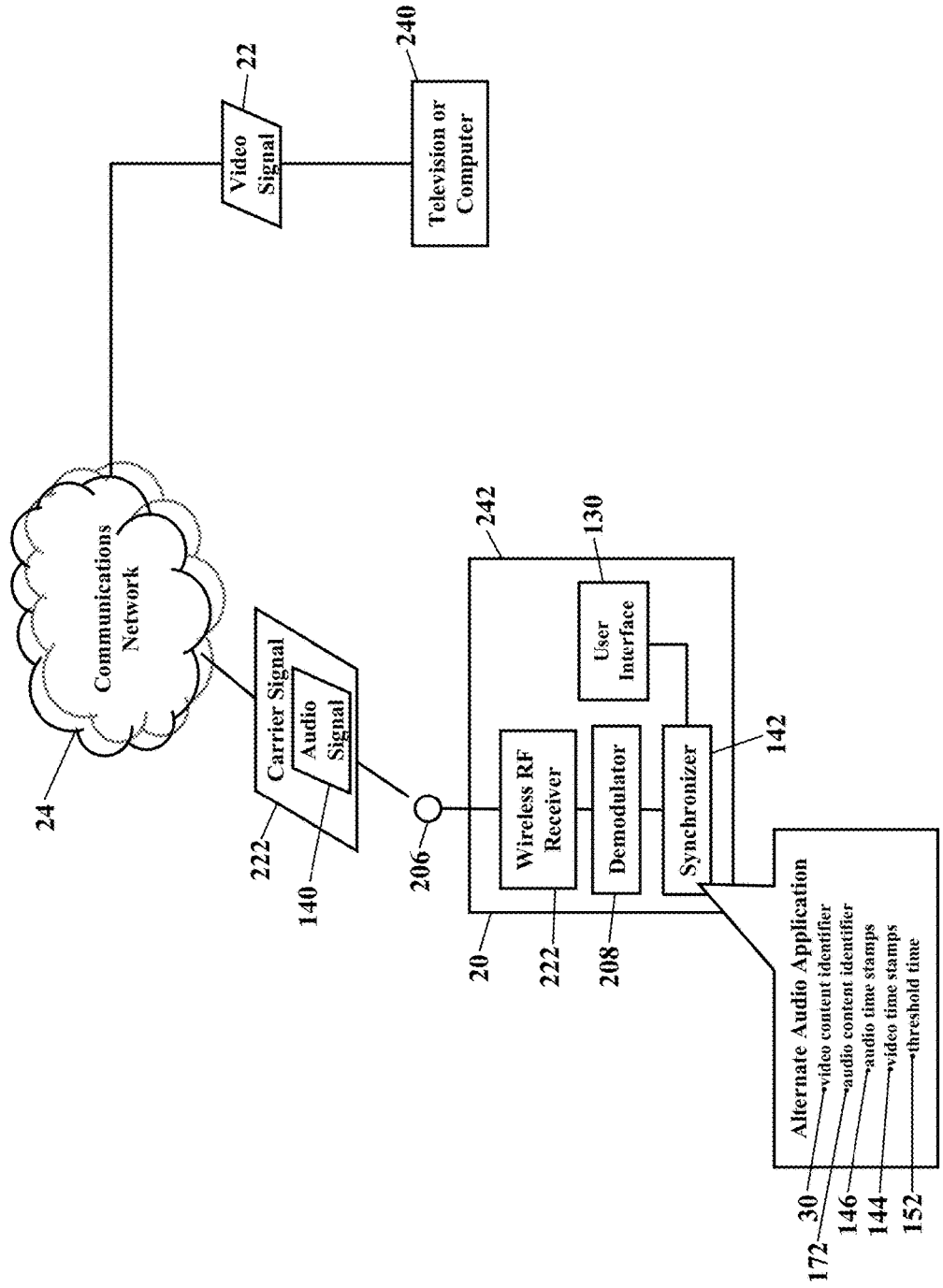

FIG. 11 is a schematic illustrating still another operating environment in which exemplary embodiments may be implemented. Here the video signal 22 is received, processed, and presented by a television or computer 240, while the audio signal 140 is separately received by an AM/FM radio 242. The AM/FM radio 242 includes the RF receiver 222 that wirelessly receives the audio signal 140 as a terrestrial broadcast. The user, for example, may be watching a football game on the television or computer 240, yet the user prefers to listen to play-by-play action from radio announcers. Unfortunately, though, the separately-received audio signal 140 may lead the video signal 22 by several seconds. The radio announcer's commentary, then, is out-of-synchronization with the television video signal 22.

Exemplary embodiments, then, may delay the audio signal 140. The user interface 130 may be used to establish an amount of delay introduced by the synchronizer 142. The user interface 130, for example, may be graphical (as illustrated and explained with reference to FIGS. 1, 5, and 8), or the user interface 130 may be a physical knob, slider, or other means for adjusting delay. When the user notices that the audio signal 140 leads the video signal 22, the user may adjust the user interface 130 to introduce a delay into the leading audio signal 140. The user refines the delay until the audio signal 140 is synchronized to the video signal 22.

Figure 12:
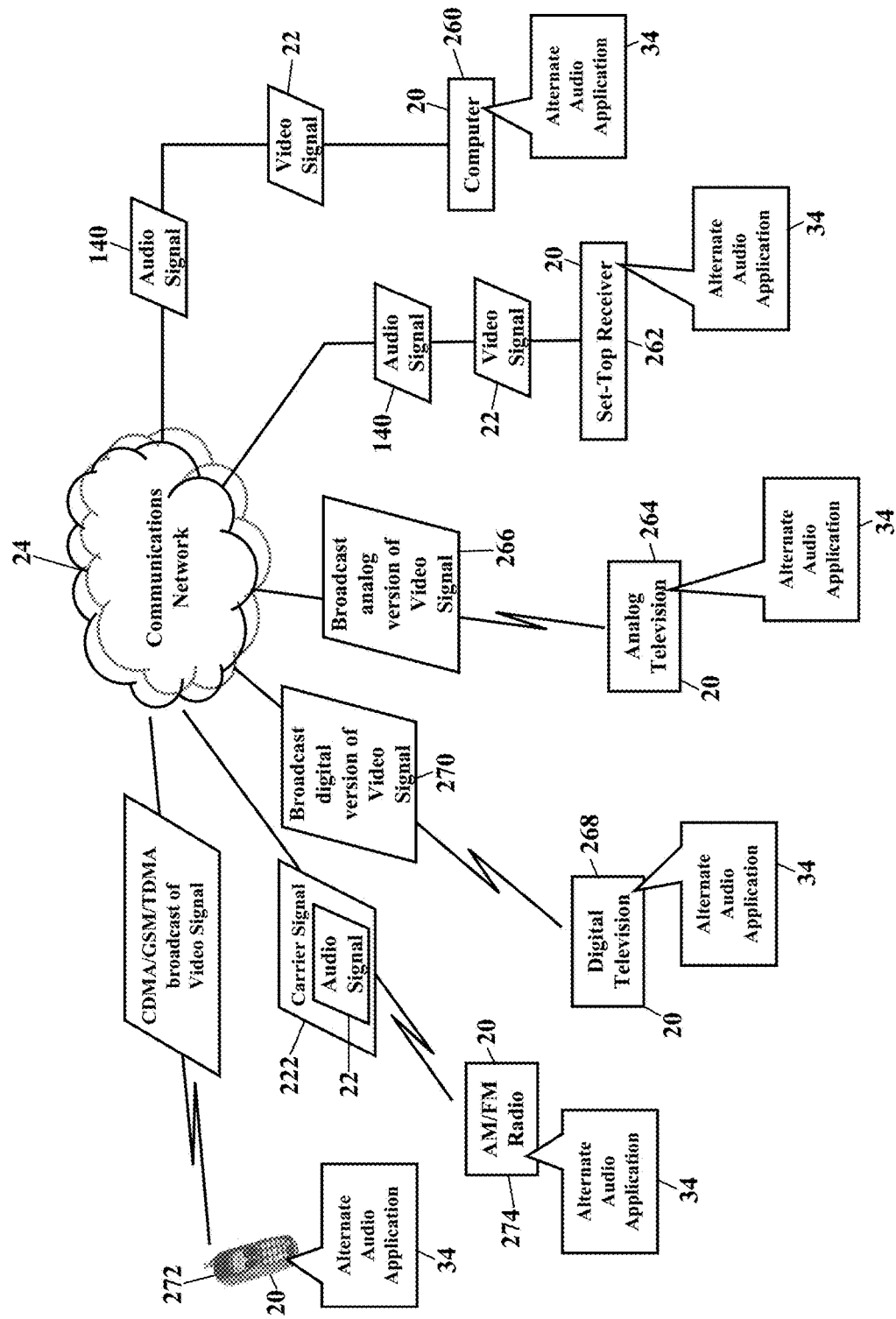

FIG. 12 is a schematic illustrating another operating environment in which exemplary embodiments may be implemented. Here the user has multiple electronic devices 20 operating in the user's residence, business, building, or other premise. Some of the electronic devices 20 may receive analog signals and some of the electronic devices 20 may receive digital signals. Some of the electronic devices 20 may receive audio signals and some of the electronic devises 20 may receive video signals. When all the electronic devices 20 receive signals that correspond to the same content, the user may need to synchronize one or more of the electronic devices 20. When, for example, all the electronic devices 20 receive the same football game, any leading or lagging audio/video signal may be annoying. Exemplary embodiments, then, allow the user to individually synchronize any of the electronic devices 20 for an enjoyable entertainment experience.

As FIG. 12 illustrates, exemplary embodiments may operate in one or more of the electronic devices 20. An instance of the alternate audio application 34, for example, may operate in a computer 260. The computer 260 may receive the video signal 22 and the separate audio signal 140 from the communications network 24. Another instance of the alternate audio application 34 may operate in a set-top receiver 262 that also receives the video signal 22 and the separate audio signal 140 from the communications network 24. Yet another instance of the alternate audio application 34 may operate in an analog television 264 that receives a terrestrially-broadcast analog version 266 of the video signal 22. Another instance of the alternate audio application 34 may operate in a digital television 268 that receives a terrestrially-broadcast standard definition or high-definition digital version 270 of the video signal 22. More instances of the alternate audio application 34 may even operate in a wireless phone 272 and an AM/FM radio 274.

Exemplary embodiments permit synchronization of all these electronic devices 20. When all the electronic devices 20 receive signals that correspond to the same content, some of the electronic devices 20 may lead or lag, thus producing an unpleasant entertainment experience. Exemplary embodiments, however, allow the user to delay the audio and/or video signals received at any of the electronic devices 20. The user may thus synchronize audio and video outputs to ensure the content remains pleasing.

Figure 13:
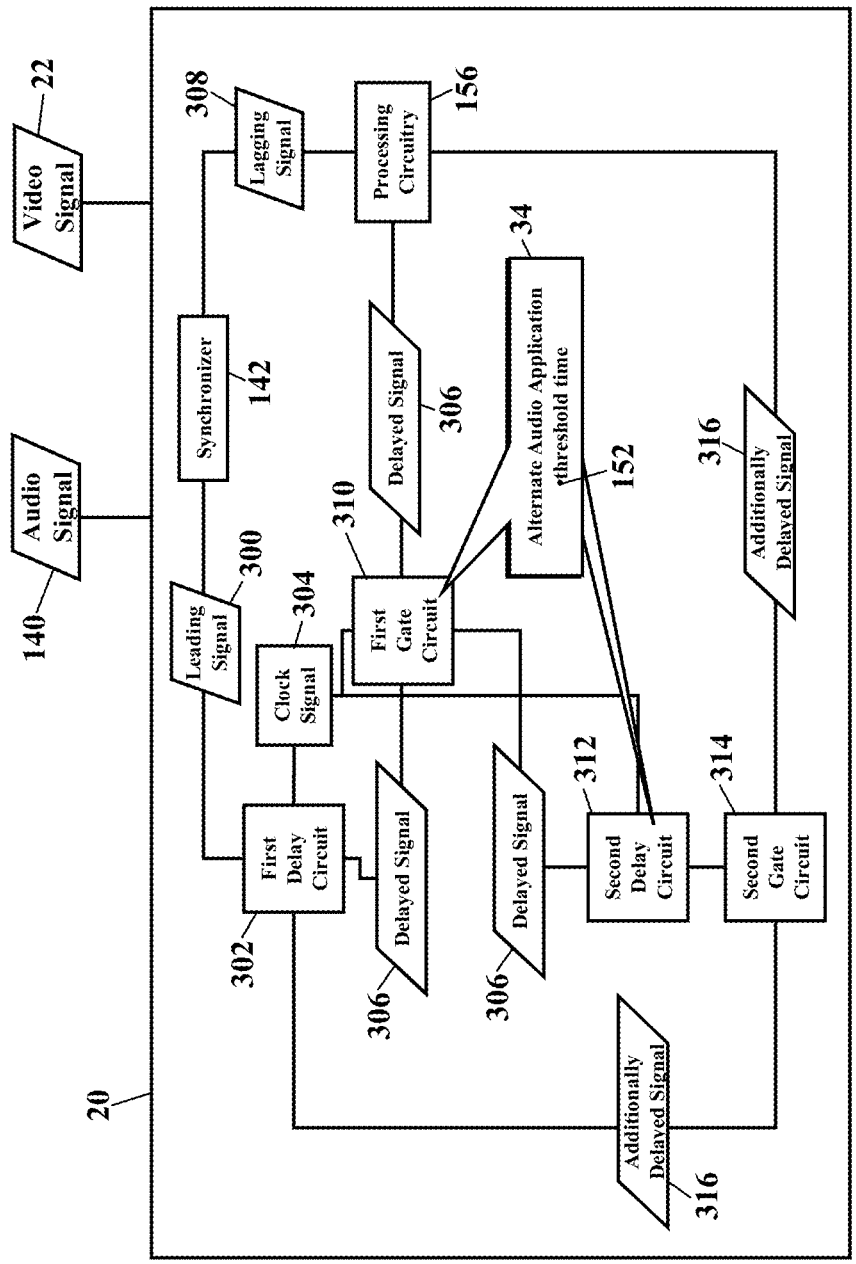

FIG. 13 is a block diagram further illustrating the electronic device 20, according to even more exemplary embodiments. When either the audio signal 140 or the video signal 22 lags, here the synchronizer 142 may divert a leading signal 300 to a first delay circuit 302. The first delay circuit 302 may comprise clocked and/or unclocked circuits or components. If clocked, a reference or clock signal 304 may be received at the first delay circuit 302. The leading signal 300 propagates through the first delay circuit 302. As the leading signal 300 propagates, delays may be introduced by the first delay circuit 302. The amount of delay may be determined according to the complexity and/or the number of components within the first delay circuit 302. When a delayed signal 306 emerges from the first delay circuit 302, the delayed signal 306 may be synchronized with a lagging signal 308. The delayed signal 306 may then be diverted through, or "peeled off" by, a first gate circuit 310 and sent to the processing circuitry 156 for audible presentation.

More delay may be needed. The first delay circuit 302 may introduce a predetermined amount of delay. Suppose, for example, that the first circuit introduces twenty milliseconds (20 msec.) of delay in the audio signal 140. If twenty milliseconds of delay does not satisfy the threshold time 152, then more delay may be needed. The first gate circuit 310, then, may feed, or cascade, the delayed signal 306 to a second delay circuit 312. The second delay circuit 312 introduces additional delay, depending on its complexity and/or number of components. If this additional delay is sufficient, then a second gate circuit 314 diverts an additionally delayed signal 316 to the processing circuitry 156. If more delay is again needed, the second gate circuit 314 may feed or cascade the additionally delayed signal 316 back to the first delay circuit 302 for additional delay. According to exemplary embodiments, the leading signal 300, then, may cascade or race through the first delay circuit 302 and through the second delay circuit 312 until synchronization is achieved.

Figure 14:
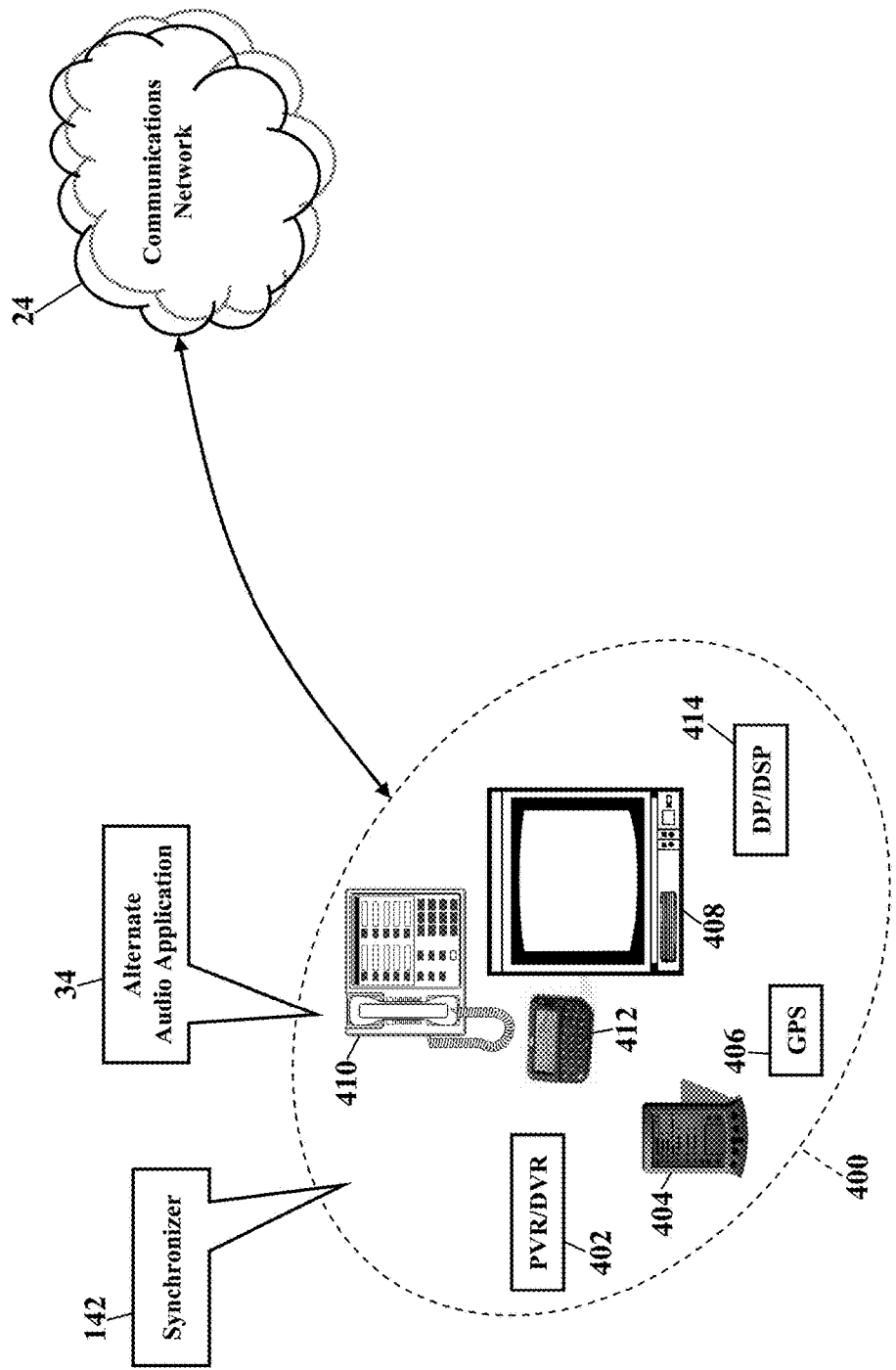

FIG. 14 depicts other possible operating environments for additional aspects of the exemplary embodiments. FIG. 14 illustrates that the alternate audio application 34 and/or the synchronizer 142 may alternatively or additionally operate within various other devices 400. FIG. 14, for example, illustrates that the alternate audio application 34 and/or the synchronizer 142 may entirely or partially operate within a personal/digital video recorder (PVR/DVR) 402, personal digital assistant (PDA) 404, a Global Positioning System (GPS) device 406, an interactive television 408, an Internet Protocol (IP) phone 410, a pager 412, or any computer system and/or communications device utilizing a digital processor and/or digital signal processor (DP/DSP) 414. The device 400 may also include watches, radios, vehicle electronics, clocks, printers, gateways, and other apparatuses and systems. Because the architecture and operating principles of the various devices 400 are well known, the hardware and software componentry of the various devices 400 are not further shown and described. If, however, the reader desires more details, the reader is invited to consult the following sources, all incorporated herein by reference in their entirety: ANDREW TANENBAUM, COMPUTER NETWORKS (4$^{th}$ edition 2003); WILLIAM STALLINGS, COMPUTER ORGANIZATION AND ARCHITECTURE: DESIGNING FOR PERFORMANCE (7$^{th}$ Ed., 2005); and DAVID A. PATTERSON & JOHN L. HENNESSY, COMPUTER ORGANIZATION AND DESIGN: THE HARDWARE/SOFTWARE INTERFACE (3$^{rd}$. Edition 2004); LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module-Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLU- TION IN ELECTRONIC IMAGING (1998); and EDWARD M. SCHWALB, iTV HANDBOOK: TECHNOLOGIES AND STANDARDS (2004).

Figure 15:
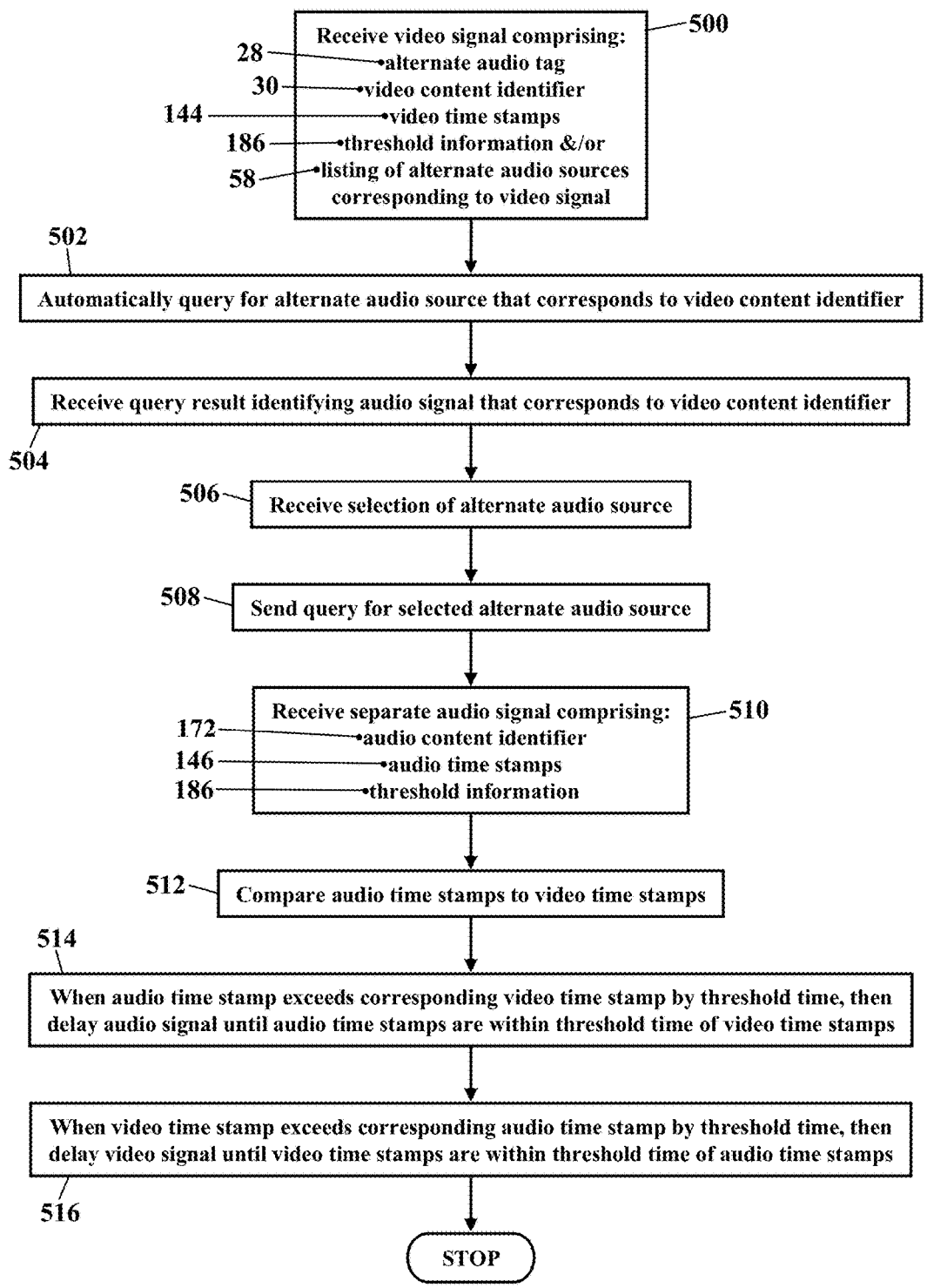
FIG. 15 is a flowchart illustrating a method of retrieving audio signals, according to more exemplary embodiments.

FIG. 15 is a flowchart illustrating a method of retrieving audio signals, according to more exemplary embodiments. A video signal is received (Block 500). The video signal may comprise the alternate audio tag 28, the video content identifier 30, the video time stamps 144, the threshold information 186, and/or the listing 58 of alternate audio sources that correspond to the video signal. In response to the alternate audio tag 28, a query is sent for an alternate audio source that corresponds to the video content identifier (Block 502). A query result is received that identifies an audio signal that corresponds to the video content identifier and that is separately received from the video signal (Block 504). A selection is received that selects an alternate audio source from the listing and/or from the query result (Block 506). Another query is sent for the alternate audio source (Block 508), and a separate audio signal is received (Block 510). The separate audio signal may comprise the audio content identifier 172, the audio time stamps 146, and the threshold information 186. The audio time stamps are compared to the video time stamps (Block 512). When an audio time stamp exceeds a corresponding video time stamp by a threshold time, then the audio signal is delayed until the audio time stamps are within the threshold time of the video time stamps (Block 514). When a video time stamp exceeds a corresponding audio time stamp by the threshold time, then the video signal is delayed until the video time stamps are within the threshold time of the audio time stamps (Block 516).

Exemplary embodiments may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, www.iomega.com). This computer-readable medium, or media, could be distributed to end-subscribers, licensees, and assignees. These types of computer-readable media, and other types not mention here but considered within the scope of the exemplary embodiments. A computer program product comprises processor-executable instructions for synchronizing audio and video content.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   receiving, by an electronic device, a video signal comprising video time stamps and a video threshold time;
   receiving, by the electronic device, an audio signal comprising audio time stamps and an audio threshold time;
   determining, by the electronic device, a permissible amount of asynchronism embedded by a content provider within at least one of the video signal and the audio signal, the permissible amount of asynchronism specified as the smaller of the two values of the video threshold time and the audio threshold time;
   determining, by the electronic device, the smaller of the two values of the video threshold time and the audio threshold time;
   determining, by the electronic device, a difference in time between any one of the audio time stamps and any one of the video time stamps; and
   delaying, by the electronic device, at least one of the video signal and the audio signal until the difference in time satisfies the permissible amount of asynchronism specified as the smaller of the two values of the video threshold time and the audio threshold time.

2. The method of claim 1, further comprising comparing the video time stamps to the audio time stamps.

3. The method of claim 1, further comprising receiving a content identifier associated with the video signal.

4. The method of claim 3, further comprising retrieving a website associated with the content identifier.

5. The method of claim 1, further comprising receiving a content identifier associated with the audio signal.

6. The method of claim 5, further comprising retrieving a website associated with the content identifier.

7. A system, comprising:
   a hardware processor; and
   a memory device, the memory device storing code, the code when executed causing the hardware processor to perform operations, the operations comprising:
   receiving a video signal comprising video time stamps and a video threshold time;
   receiving an audio signal obtained from a social network, the audio signal comprising audio time stamps and an audio threshold time;
   extracting a permissible amount of asynchronism using data embedded by a content provider within at least one of the video signal and the audio signal, the permissible amount of asynchronism specified as the smaller of the two values of the video threshold time and the audio threshold time;
   determining the smaller of the two values of the video threshold time and the audio threshold time;
   determining a difference in time between any of the audio time stamps and any of the video time stamps; and
   delaying at least one of the video signal and the supplemental audio signal until the difference in time satisfies the permissible amount of asynchronism specified as the smaller of the two values of the video threshold time and the audio threshold time.

8. The system of claim 7, wherein the operations further comprise comparing the video time stamps to the audio time stamps.

9. The system of claim 7, wherein the operations further comprise determining the audio signal leads the video signal.

10. The system of claim 7, wherein the operations further comprise determining the audio signal lags the video signal.

11. The system of claim 7, wherein the operations further comprise receiving a content identifier associated with the video signal.

12. The system of claim 11, wherein the operations further comprise retrieving a website associated with the content identifier.

13. The system of claim 7, wherein the operations further comprise receiving a content identifier associated with the audio signal.

14. The system of claim 13, wherein the operations further comprise retrieving a website associated with the content identifier.

15. A memory device storing instructions that when executed cause a hardware processor to perform operations, the operations comprising:

receiving a video signal at a device, the video signal comprising video time stamps and a video threshold time;

receiving a supplemental audio signal at the device, the supplemental audio signal obtained from a social network, the supplemental audio signal comprising audio time stamps and an audio threshold time;

extracting a permissible amount of asynchronism from data embedded by a content provider within at least one of the video signal and the audio signal received at the device, the permissible amount of asynchronism specified by the content provider as the smaller of the two values of the video threshold time and the audio threshold time;

determining a difference in time between the audio time stamps and the video time stamps;

comparing the difference in time to the smaller of the two values of the video threshold time and the audio threshold time; and delaying at least one of the video signal and the audio signal until the difference in time satisfies the permissible amount of asynchronism specified as the smaller of the two values of the video threshold time and the audio threshold time.

16. The memory device of claim 15, wherein the operations further comprise comparing the video time stamps to the audio time stamps.

17. The memory device of claim 15, wherein the operations further comprise determining the audio signal leads the video signal.

18. The memory device of claim 15, wherein the operations further comprise determining the audio signal lags the video signal.

19. The memory device of claim 15, wherein the operations further comprise receiving a content identifier associated with the video signal.

\* \* \* \* \*